March 29, 1932.   H. MOSCHEL   1,851,018
HAY PRESS
Filed Nov. 12, 1928
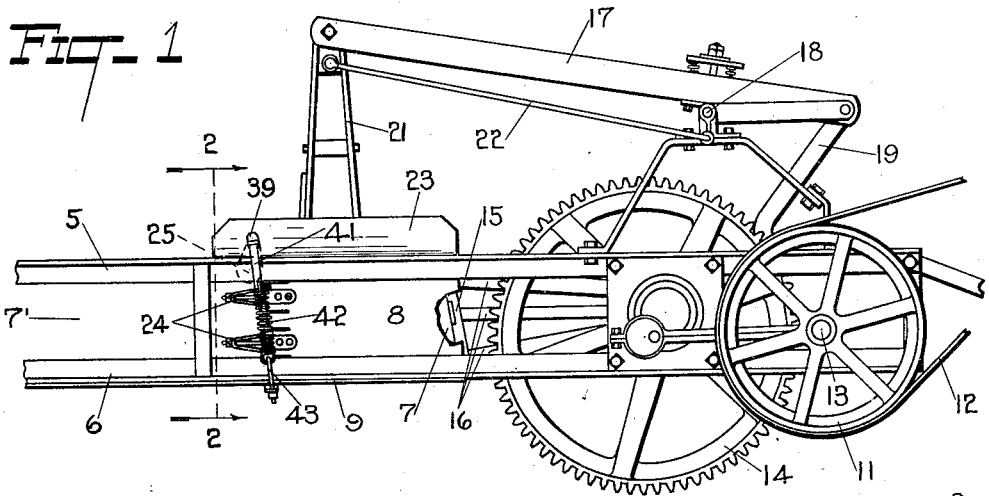
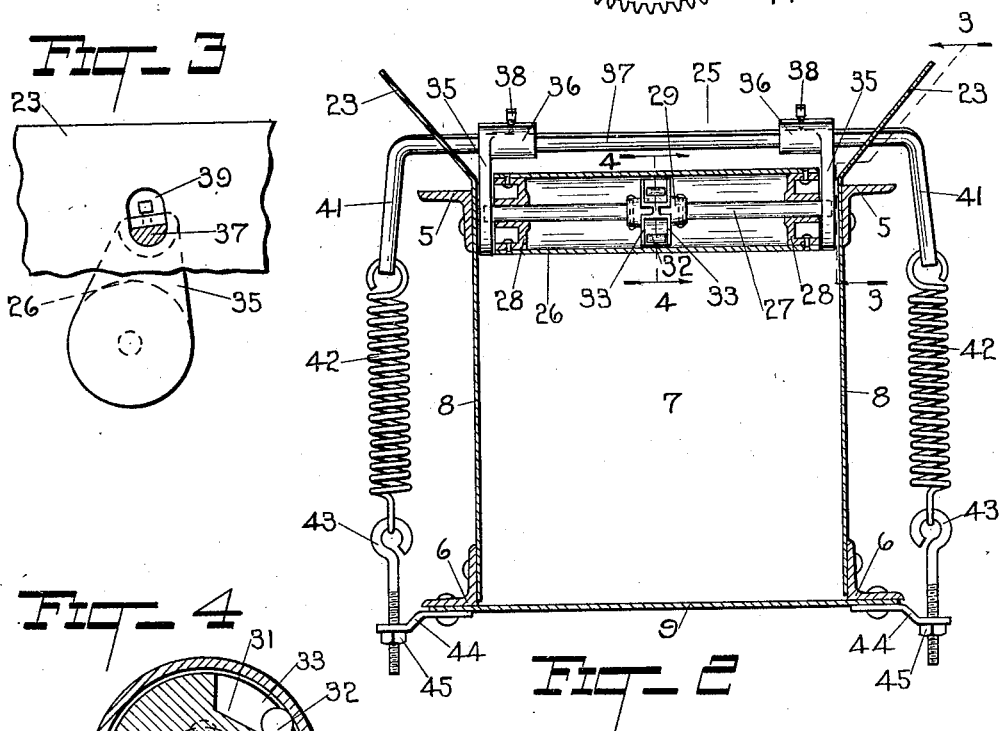
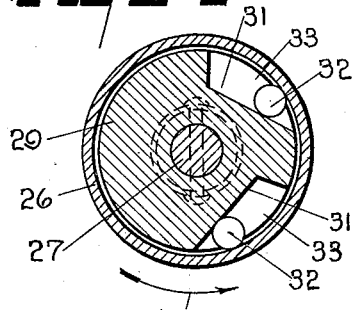
Inventor
Herman Moschel
By Brown, Jackson, Boettcher & Diemer
Attorneys
Witness
A. D. McLeay Patented Mar. 29, 1932

1,851,018

UNITED STATES PATENT OFFICE

HERMAN MOSCHEL, OF OTTUMWA, IOWA, ASSIGNOR TO DAIN MANUFACTURING COMPANY OF IOWA, OF OTTUMWA, IOWA, A CORPORATION OF IOWA

HAY PRESS

Application filed November 12, 1928. Serial No. 318,820.

The present invention relates generally to hay presses and particularly to the tuckers therefor, such tucking devices being commonly provided on baling presses for tucking in the projecting ends of the hay between successive charges.

As is well known by those familiar with these machines, the tucker must be mounted so that it can yield under the pressure of the hay passing under it, particularly when a relatively heavy charge of hay is forced below the tucker. One of the principal objects of the invention is to provide an improved tucker mounting which will permit the tucker to swing upwardly with a rocking movement as well as to lift substantially vertically, the combination of these two movements affording an amplitude of movement of the tucker sufficient to accommodate even the heaviest overcharge of hay.

In the preferred construction, a roller type of tucker is used, and in such embodiment the tucker is capable of three movements in the act of tucking in the hay and adapting itself to charges of different sizes, these three movements consisting of rotation of the roller on its own axis, upward swinging or rocking movement of the entire roller, and a substantially vertical lifting movement of the entire roller.

Another object of the invention is to provide an improved mounting for the tucker roller which will dispose the axis of the roller below the top of the bale case without necessitating notching or cutting out the frame angles forming the upper corners of the bale case. Such disposal of the tucker is more efficient for folding the hay, and by the present construction is obtained without weakening the frame of the press.

Further objects are to provide a construction which will avoid all tendency of the roller shaft to bend, and which will avoid the previous tendency for hay to accumulate between the roller shaft and the top of the bale case.

Other objects and advantages of the invention will be apparent from the following description of a preferred embodiment thereof.

In the accompanying drawings illustrating such embodiment:

Figure 1 is a fragmentary side elevational view of a hay press, illustrating the present tucker in operative position thereon;

Figure 2 is a transverse sectional view through the baling chamber, taken on the plane of the line 2—2 of Figure 1, the tucker roller being illustrated in longitudinal section;

Figure 3 is a fragmentary sectional view taken approximately on the plane of the line 3—3 of Figure 2; and Figure 4 is a transverse sectional view of the roller taken on the plane of the line 4—4 of Figure 2.

Referring to Figure 1, wherein I have shown a conventional type of hay press for illustrating a typical adaptation of my improved tucker, 5 and 6 indicate upper and lower frame members of a series of four frame members defining a rectangular bale chamber 7, having side walls 8 and a bottom wall 9 (Figure 2). Extending rearwardly in continuation of this bale chamber is an open rectangular frame defining the usual compressing chamber 7'. Upon the forward portion of the frame 5—6 is mounted gearing of any suitable arrangement for actuating the plunger and self-feeder. In the typical construction shown, 11 is a pulley with which any suitable operating power is connected by a belt 12.

Upon the shaft 13 of this pulley is mounted a pinion which is in driving mesh with a large gear 14. The plunger, indicated at 15, is connected by bars 16 to a wrist pin (not shown) projecting from the side of the large gear. As this is revolved, the plunger 15 is caused to travel back and forth in the feed chamber portion of the baling case. A feeder arm 17 is pivoted at 18 upon brackets extending upwardly from the frame. A link 19 connects the feeder arm with the previously mentioned wrist pin on the large gear 14. Depending from the other end of the feeder arm 17 is a feeding head 21, the position of which, relative to the arm 17, is controlled by a link 22. The hay is inserted into the bale case through a hopper defined between the outwardly sloping side walls 23 (Figure 2) and having a feeding opening communicating with the top of the bale chamber and through which the hay is forced down into the latter. Mounted on the vertical side walls of the bale case are the usual retaining dogs or stops 24 for engaging the hay in a manner well known. As above remarked, the hay press just described is merely representative of any conventional type of hay press, shown for the purposes of illustrating a typical adaptation, it being understood that the present tucker is adaptable to practically any type of press.

This tucker, indicated in its entirety at 25, is mounted on the top of the frame or bale chamber 7, just at or in proximity to the end of the feed opening through which the hay is forced from the hopper 23 into the bale chamber. The tucker comprises a roller 26 mounted on a transversely extending shaft 27, the ends of the roller being closed by drums or heads 28 which are pinned or otherwise secured therein and which have relatively long bearing hubs affording extensive bearing support for the roller 26 on the shaft 27. Any suitable mechanism may be employed for preventing rotation of the roller in one direction, the present mounting of the tucker being adapted, however, to that type of mechanism which is completely enclosed within the roller. In such construction, a hub or boss 29 is fixedly secured on the shaft 27, preferably midway between the ends of the roller, such hub or boss having laterally extending portions for receiving transverse pins passing through the shaft 27 and non-rotatably securing the member 29 to the shaft. As shown in Figure 4, the circular periphery of said member 29 is spaced slightly from the inner wall of the cylinder 26 to avoid frictional wear between the parts, and formed in the peripheral portions of said member are a plurality of tapering pockets 31. There are preferably two of these pockets located substantially at the points shown, each pocket being of increasing radial depth in a direction corresponding to the direction of free rotative movement of the roller 26.

Disposed in these pockets are clutch elements 32 which are free to roll from end to end of the pocket, such elements consisting either of balls or of cylindrical rollers, either type being optionally employed. Each pocket 31 has side walls 33 which prevent endwise displacement of the rollers or balls from the stationary clutch member 29. The arrow x in Figure 4 indicates the direction of free rotative movement of the tucker roller 26, and it will be observed that the two pockets 31 are so arranged that gravitational force acting on the clutch elements 32 will tend to roll these clutch elements downwardly toward the shallow ends of the pockets, in a direction counter to the direction of free rotative movement of the tucker roller. Rotation of the tucker roller in the direction indicated will merely result in the clutch elements 32 playing idly between the inner surface of the roller and the lower ends of the pockets 31. When, however, the tucker roller starts to revolve in the opposite direction the clutch elements will be forced into wedging engagement between the inner surface of the roller and the shallow ends of the pockets 31, thus holding the roller against such rotation by the frictional or wedging pressure which the clutch elements establish between the roller and the stationary clutch member 29. The use of such type of ball or roller clutch, enclosed completely within the tucker roller, is advantageous because of the mounting of the tucker roller between swinging supporting arms, which I shall now describe.

The length of the tucker roller is slightly less than the width of the bale chamber 7 to accommodate two swinging arms 35, which extend down into the bale case at each end of the roller. As shown in Figure 3, the lower ends of these arms are curved circularly and are of approximately the same diameter as the tucker roller, whereby they form in effect end continuations of said roller and close the spaces between the ends of the roller and the side walls of the bale case. The roller shaft 27 has its ends projecting beyond the ends of the roller and rigidly secured within the side arms 35 so that said shaft is held against axial rotation. The upper ends of these depending side arms 35 are formed with horizontal hubs or bosses 36 which are secured to a transversely extending rock shaft 37 disposed above the tucker roller. To more effectively secure the hubs 36 to said shaft the latter may be formed of irregular or polygonal cross section, in the preferred construction shown said shaft being formed of half-round bar, and the hubs 36 having correspondingly shaped openings therethrough for receiving this shaft. Set screws 38 screw into the hubs and engage the shaft for holding the depending arms 35 at a fixed lateral spacing on the shaft.

The projecting end portions of the rock shaft 37 have mounting in suitable supports, preferably consisting of the outwardly sloping side walls 23 of the hopper. As shown in Figure 3, these side walls are provided with slotted openings 39 having rounded lower ends in which the rounded under surface of the shaft has rocking support. Extending downwardly from the ends of the rock shaft, outside of the bale case, are arms 41 which may be formed as downwardly bent extensions of said shaft or which may consist of separate arms rigidly secured to the shaft. Said arms extend down a sufficient distance from the shaft to have considerable leverage thereon, and are apertured at their lower ends for receiving the hooked upper ends of tension springs 42. The lower ends of these springs are hooked to eye bolts 43 extending through brackets 44 projecting from the bottom of the bale case. The threaded lower ends of said eye bolts receive nuts 45 engaging below the brackets, by the manipulation of which nuts the tension of the springs 42 can be adjusted.

Referring now to the operation of the tucker, in the forward compressing stroke of the plunger 15 the tucker roller 26 will revolve freely as the hay is forced under the same, the ball clutch mechanism permitting rotation of the roller in this direction. Concurrently with the rotation of the roller it is pressed yieldingly downwardly against the top of the charge of hay under the action of the springs 42.

In maintaining this pressure engagement the roller is capable of yielding in two directions or with two motions, to wit: The roller can swing forwardly and upwardly around the axis of the rock shaft 37 with the forward movement of the charge of hay, and the roller can also be displaced substantially vertically with a translatory motion. Thus the roller is capable of accommodating itself even to an excessive overcharge of hay, the combination of the swinging and translatory movements affording a wide range of movement of the roller. It will be noted that the springs 42 yieldingly resist both movements. When the roller oscillates forwardly and upwardly around the axis of the rock shaft 37 the side arms 41 function as crank arms through which the springs 42 transmit their tension to oppose such rocking movement of the shaft 37. Similarly, when the roller is displaced upwardly in its translatory movement the springs 42 also yieldingly oppose such motion, tending to hold the rock shaft down in the lower ends of the slots 39. By adjusting the tension of the springs 42 the pressure which the roller exerts against the charge of hay can be increased or decreased. In the retractive movement of the plunger 15 the roller moves down behind the compressed charge of hay under the action of such springs, thus turning downwardly or tucking in the ends of the hay projecting from the upper part of this charge. In such retractive movement of the plunger, the ball clutch mechanism comes into operation for holding the roller against rotation in the opposite direction, which aids in tucking in the projecting ends of the hay and preventing such from being drawn backwardly by the retractive movement of the plunger.

In the next forward stroke of the plunger the tucked-in ends will be compressed between the previous charge and the new charge being forced forwardly by the plunger.

It will be noted that the present construction disposes the tucker roller with its axis below the top of the bale case, represented by the tops of the upper frame bars 5, without necessitating notching or cutting out these frame bars and thereby weakening the same. A roller tucker which has its axis disposed below the top of the bale case folds the hay more efficiently than one having its axis above the bale case. The present construction also avoids the long projecting ends of the roller shaft 27, usually necessary in prior constructions, and thereby gives added strength to the shaft against bending. In prior constructions any bending of such shaft is almost certain to affect the ball clutch mechanism so that the same does not function properly. Owing to the absence of outwardly projecting ends of the roller shaft 27 there is no possibility of hay accumulating between said shaft and the top of the bale case frame bars 5 which frequently prevents the tucker from moving downwardly to its proper position in prior constructions.

As shown in Figures 1 and 3, the elongated openings 39 and the line of tension of the springs 42 may be inclined slightly so that with the upward movement of the rock shaft 37, with the lifting of the tucker roller, the rock shaft and roller will be carried slightly forwardly in the direction of movement of the plunger 15.

The axis of the tucker roller may also be disposed slightly forwardly of the vertical axial plane of the rock shaft 37 (Figure 3) so that the initial rocking movement of the roller is upwardly as well as forwardly. Such angle relation between the slots 39, the springs 42 and the roller supporting arms 35 also aids in the proper restoration of the tucker roller to normal position after the same has been deflected upwardly.

Having thus described my invention, what I claim as new and desire to secure by Letters Patent is:

1. A tucker adapted for association with the bale chamber of a hay press comprising a tucker roller, a rock shaft extending transversely of the bale chamber, and means mounted on said shaft for supporting the roller in normal position directly below said shaft.

2. A tucker adapted for association with the bale chamber of a hay press comprising a tucker roller, a rock shaft extending transversely of the bale chamber, arms extending downwardly from said rock shaft and supporting said roller at its opposite ends directly below said rock shaft, and spring means opposing rocking movement of said shaft.

3. A tucker adapted for association with the bale chamber of a hay press comprising a roller, a rock shaft extending transversely of the bale chamber, means carried by said shaft for supporting said roller below the shaft, and means supporting said shaft for rocking and substantially vertical lifting movements thereof.

4. A tucker adapted for association with the bale chamber of a hay press comprising a roller, a rock shaft extending transversely of the bale chamber, arms depending from said shaft and supporting said roller at its opposite ends, mounting means for said shaft providing for rocking and substantially vertical lifting movements thereof, arms extending from the end portions of said shaft, and spring means connected with said latter arms for yieldingly opposing the rocking and lifting movements of said shaft.

5. A tucker adapted for association with the bale chamber of a hay press comprising a roller, a rock shaft extending transversely of the bale chamber, above the same, crank arms extending downwardly from said rock shaft into said bale chamber, said roller being mounted between said crank arms, supporting means for said rock shaft, arms extending downwardly from the outer portions of said shaft on the outer sides of the bale chamber, and springs connected with said latter arms for yieldingly opposing motion of said rock shaft.

6. A tucker adapted for association with the bale chamber of a hay press comprising a roller, a shaft extending transversely of the bale chamber above the same, arms mounted on said shaft and extending downwardly into said bale chamber, said roller being mounted between said arms, supporting means having upwardly extending slot-like openings for supporting said shaft, said shaft being capable of rocking and upward lifting movements in said openings, arms extending downwardly from said shaft on the outer sides of the bale chamber, and tension springs connected with said latter arms for opposing the rocking and lifting movements of said shaft.

7. A tucker adapted for association with the bale chamber of a hay press comprising a tucker roller, an axial shaft on which said roller is rotatably supported, a rock shaft extending transversely of the bale chamber above said tucker roller, said rock shaft being constructed of half-round bar stock with its rounded side disposed lowermost, crank arms having hubs secured to said rock shaft, said crank arms extending down into the bale chamber and supporting the ends of said axial shaft, supporting means for said rock shaft having upwardly extending slot-like bearing openings in which said shaft can rock and also move upwardly, the outer ends of said rock shaft being bent downwardly to form arms disposed outside of the bale chamber, and tension springs connected to said latter arms and acting downwardly to oppose rocking and upward lifting movements of said rock shaft.

8. A tucker adapted for association with the bale chamber of a hay press comprising a rock shaft extending transversely of the bale chamber and disposed above the top of the same, said rock shaft having rocking and translational movements, spring means for resisting said movements, arms extending downwardly from said rock shaft into the bale chamber, and a tucker roller mounted between said arms with its rotative axis disposed below the top of the bale chamber.

9. A tucker adapted for association with the bale chamber of a hay press comprising a tucker roller, means contained within the roller for preventing axial rotation of said roller in one direction, and mounting means for said roller providing for swinging movement thereof substantially horizontally in either direction around said mounting means as an axis.

10. A tucker adapted for association with the bale chamber of a hay press comprising a tucker roller, a shaft on which the same is mounted, ball clutch mechanism contained within said roller and cooperating with said shaft for preventing rotation of said roller in one direction, and mounting means for said roller providing for swinging thereof substantially horizontally in either direction around said mounting means as an axis and providing for substantially vertical movement of the roller.

11. In a hay press the combination with a bale chamber and compressing mechanism, of walls extending upwardly from said bale chamber and defining a hopper, said walls having upwardly extending inclined slots therein, a transversely extending rock shaft mounted in said slots, arms supported on said rock shaft and extending downwardly into the bale chamber, a tucker roller mounted between said arms, arms extending downwardly from the outer ends of said rock shaft, and tension springs connected to said latter arms and pulling downwardly thereon in a direction substantially parallel with the inclined angle of said slots, said first mentioned arms being angularly offset from said second mentioned arms in the direction of movement of the material being compressed in the bale chamber.

12. A tucker adapted for association with the bale chamber of a hay press comprising a rock shaft, a tucker roller mounted below said rock shaft, and spaced means depending from said rock shaft and supporting said roller at their lower ends, said roller having substantially horizontal swinging movement around said rock shaft as an axis, as well as substantially vertical movement relatively to the bale chamber.

13. A tucker adapted for association with the bale chamber of a hay press comprising a rock shaft extending transversely of the bale chamber, a tucker member mounted below said rock shaft, spaced means depending from said rock shaft and supporting said tucker member at their lower ends, said member having substantially horizontal swinging movement in either direction around said rock shaft as an axis as well as substantially vertical movement relatively to the bale chamber under the pressure of the material being baled, and spring means normally opposing such displacement of said tucker member.

14. A tucker adapted for association with the bale chamber of a hay press comprising a rock shaft, means connected with said rock shaft and supporting a transversely extending shaft, a tucker roller axially mounted upon said latter shaft, said tucker member being adapted for substantially horizontal swinging movement in either direction around said rock shaft as an axis and for substantially vertical movement relatively to the bale chamber.

15. A tucker adapted for association with the bale chamber of a hay press comprising a rock shaft, a second shaft disposed below said rock shaft, spaced arms depending from said rock shaft and supporting said second shaft at their other ends, a tucker roller axially mounted upon said second shaft and adapted to swing substantially horizontally in either direction around said rock shaft as an axis and to have substantially vertical movement relatively to the bale chamber, the said arms maintaining said tucker member in a definite spaced relation from said rock shaft during such movements.

16. A tucker adapted for association with the bale chamber of a hay press comprising a roller, a rock shaft extending transversely of the bale chamber, means carried by said shaft for supporting said roller below the shaft, means supporting said shaft and providing for rocking and substantially vertically lifting movements thereof and means for normally opposing the rocking and lifting movements of said shaft.

17. A tucker adapted for association with the bale chamber of a hay press comprising a tucker roller extending transversely of the bale chamber, and mounting means for said roller providing for axial rotation thereof, swinging motion thereof fore and aft of the bale chamber about an axis spaced from the axis of the roller, and translational motion substantially vertically thereof under the pressure of the material being baled.

18. A tucker adapted for association with the bale chamber of a hay press comprising a tucker roller extending transversely of the bale chamber, mounting means for said roller spaced from the axis thereof and providing for axial rotation of said roller, swinging motion fore and aft of the bale chamber about said mounting means as an axis and translational motion substantially vertically independently of said swinging motion, under the pressure of the material being baled, and spring pressure acting through said mounting means for normally resisting the two latter movements thereof.

19. A tucker adapted for association with the bale chamber of a hay press comprising a tucker member extending transversely of the bale chamber, and mounting means for said member spaced from the axis thereof and providing for swinging motion substantially horizontally fore and aft of the bale chamber about said mounting means as an axis.

20. A tucker adapted for association with the bale chamber of a hay press comprising a tucker member extending transversely of the bale chamber, mounting means for said member comprising a shaft spaced from the axis thereof and providing for swinging motion fore and aft of the bale chamber about said mounting means as an axis, and means acting directly through said shaft for resisting the aforesaid movement.

21. A tucker adapted for association with the bale chamber of a hay press comprising a tucker roller extending transversely of the bale chamber, and mounting means for said member spaced from the axis thereof and providing for swinging motion thereof in either direction from its normal position fore and aft of the bale chamber about said mounting means as an axis.

In witness whereof I hereunto subscribe my name this 6th day of November, 1928.

HERMAN MOSCHEL.